(12) United States Patent
Rubinstein et al.

(10) Patent No.: US 6,856,320 B1
(45) Date of Patent: Feb. 15, 2005

(54) DEMAND-BASED MEMORY SYSTEM FOR GRAPHICS APPLICATIONS

(75) Inventors: Oren Rubinstein, Sunnyvale, CA (US); Ming Benjamin Zhu, San Jose, CA (US)

(73) Assignee: NVIDIA U.S. Investment Company, Santa Clara, CA (US)

( * ) Notice: Subject to any disclaimer, the term of this patent is extended or adjusted under 35 U.S.C. 154(b) by 294 days.

(21) Appl. No.: 09/709,964

(22) Filed: Nov. 10, 2000

Related U.S. Application Data (63) Continuation-in-part of application No. 08/978,491, filed on Nov. 25, 1997.

(51) Int. Cl.[7] .............................................. G06F 12/02
(52) U.S. Cl. ..................... 345/543; 345/537; 345/538; 345/545; 345/562
(58) Field of Search ................................ 345/543, 582, 345/423, 516, 517, 553, 568, 545, 537, 562; 711/208, 207, 205, 206, 209

(56) References Cited

U.S. PATENT DOCUMENTS 6,344,852 B1 * 2/2002 Zhu et al.
6,380,935 B1 * 4/2002 Heeschen et al.
6,396,473 B1 * 5/2002 Callahan et al.

* cited by examiner

*Primary Examiner*—Matthew C. Bella
*Assistant Examiner*—Hau Nguyen
(74) *Attorney, Agent, or Firm*—Townsend and Townsend and Crew LLP (57) ABSTRACT

A memory system and methods of operating the same that drastically increase the efficiency in memory use and allocation in graphics systems. In a graphics system using a tiled architecture, instead of pre-allocating a fixed amount of memory for each tile, the invention dynamically allocates varying amounts of memory per tile depending on the demand. In one embodiment all or a portion of the available memory is divided into smaller pages that are preferably equal in size. Memory allocation is done by page based on the amount of memory required for a given tile.

6 Claims, 5 Drawing Sheets

| LOGICAL ADDRESS | INDEX | PHYSICAL ADDRESS | VALID |

DEMAND-BASED MEMORY SYSTEM FOR GRAPHICS APPLICATIONS

CROSS-REFERENCES TO RELATED APPLICATIONS

This application is a continuation-in-part of commonly-assigned U.S. patent application Ser. No. 08/978,491, titled "Rendering Pipeline," by Zhu, filed Nov. 25, 1997, and hereby incorporated by reference in its entirety.

BACKGROUND OF THE INVENTION

The present invention relates in general to memory systems, and in particular to a memory system that provides for efficient use and allocation of memory resources in graphics applications.

Limited memory bandwidth has been a major obstacle in improving the performance of traditional 3-D graphics pipelines. Tiling or "chunking" has evolved as an alternative architecture that reduces the demand on memory bandwidth in 3-D graphics pipelines. A graphics pipeline using tiling architecture segments the rasterization area into a regular grid of tiles. Input geometry and commands are then "binned" into separate memory regions for each tile, such that only the geometry and commands which affect rasterization of a given tile need be read by the rasterization hardware. By storing, for example, one tile worth of data in memory that is local to the processor, external memory bandwidth requirements are significantly reduced.

While this type of tile-based architecture improves memory bandwidth, it also increases the demand for larger memory. Pipelining techniques whereby one frame is rendered at the same time the next frame is being binned, require even larger memory since a rendering buffer is provided in addition to a binning buffer. It therefore becomes necessary to allocate memory resources in this type of tiled architecture as efficiently as possible. Conventional approaches, however, pre-allocate allocate a fixed amount of memory for each tile. In this type of memory system inefficiencies arise when, for example, the amount of geometry data for a given tile is larger than the pre-allocated amount of memory. This results in the inability of the graphics hardware to process all the data and render the tile. Conversely, a particular tile with a small amount of geometry data may require less memory than that provided by the pre-allocated memory resulting in portions of the pre-allocated memory to go unused.

There is therefore a need for a memory system that provides for more efficient use and allocation of memory resources in graphics applications.

SUMMARY OF THE INVENTION

The present invention provides a memory system and methods of operating the same that drastically increase the efficiency in memory use and allocation in graphics systems. Broadly, in a graphics system using a tiled architecture, instead of pre-allocating a fixed amount of memory for each tile, the present invention dynamically allocates varying amounts of memory per tile depending on the demand. In one embodiment all or a portion of the available memory is divided into smaller "pages" that are preferably equal in size. Memory allocation is done by page based on the amount of memory required for a given tile. The smaller the size of the page the higher the granular resolution, and therefore the more efficient memory allocation becomes. In one embodiment, the size of the page is made configurable. This page-based memory system removes the limitation on the memory size for a single tile by simply allocating more pages when necessary. Therefore, a tile wherein a large amount of geometry may lie would not cause an exception. In one embodiment, when all geometry data stored in a page of memory has been rendered, the page is freed and made available for reallocation. This effectively reduces the over-all amount of memory used for binning, eliminating the need for double-buffering for a system that pipelines the binning and the rendering process.

Accordingly, in one embodiment, the present invention provides a method of processing graphics data comprising dividing an image rendering area into a plurality of tiles; binning input graphics data; organizing memory into a plurality of pages; and allocating one or more pages of memory to store binned data per tile, wherein the number of pages allocated is determined by the size of the binned data for each tile.

In another embodiment, the present invention provides a memory system comprising memory divided into a plurality of pages and configured to store graphics data; a memory management unit coupled to the memory and configured to maintain a plurality of page descriptors corresponding to the plurality of pages; and a tile management unit coupled to the memory and configured to maintain a plurality of tile descriptors corresponding to a plurality of screen tiles.

In yet another embodiment, the present invention provides a computer system for processing graphics data, comprising a binning engine coupled to receive graphics data and configured to bin graphics data into screen tiles; memory coupled to the binning engine; and a rendering engine coupled to the memory and configured to render binned graphics data, wherein the memory is divided into a plurality of pages, and is configured to allocate one or more pages per tile depending on tile requirements.

The following detailed description and the accompanying drawings provide a better understanding of the nature and advantages of the page-based memory system of the present invention.

DETAILED DESCRIPTION OF SPECIFIC EMBODIMENTS

Figure 1:
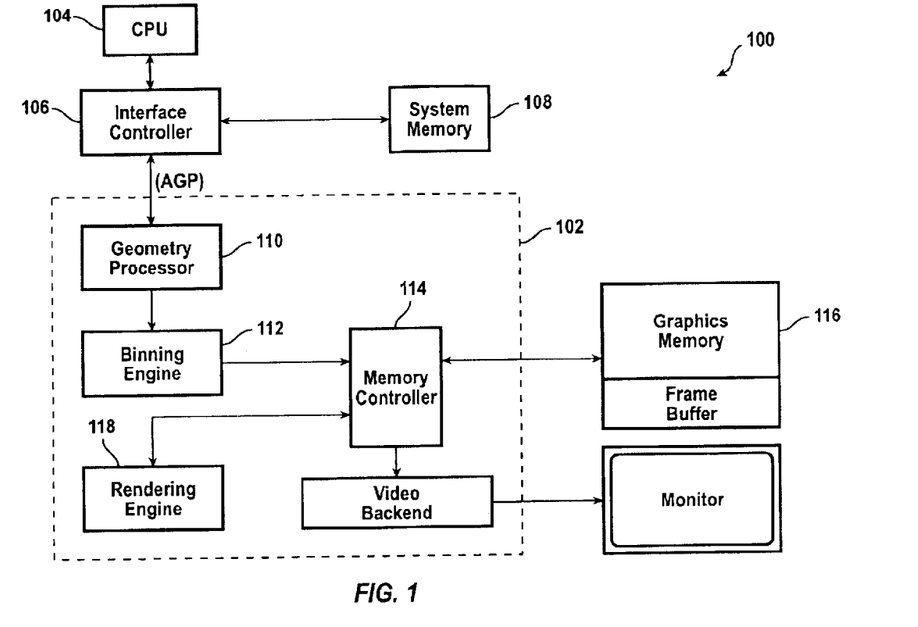
FIG. 1 is a graphics system that processes graphics data in accordance with an embodiment of the present invention.

FIG. 1 is a block diagram of a graphics system 100 that processes graphics data in accordance with an embodiment of the present invention. A graphics processor 102 is coupled to a central processing unit (CPU) 104 by a bus, such as an advanced graphics protocol (AGP) bus, via an interface controller 106. System memory 108 also couples to CPU 104 via interface controller 106. Graphics processor 102 includes a geometry processor 10 that receives graphics data from CPU 104. Graphics data typically includes geometry data and mode data. Geometry data comprises information relating to various polygons (e.g., triangles, parallelograms, rectangles, circles, etc.) which are processed to produce a complete image. Geometry data specifies, for example, the vertices (e.g., in X,Y,Z coordinates) and color (e.g., red-green-blue (RGB)) combinations for various polygons. Mode data comprises information relating to various modes affecting the appearance of one or more geometries when displayed. For example, for a given geometry, mode data can define or specify one or more "textures" (e.g., fur, brick, bark, sky), blending effects, translucence effects, and the like, which may be applied to the rendered geometry.

Figure 2:
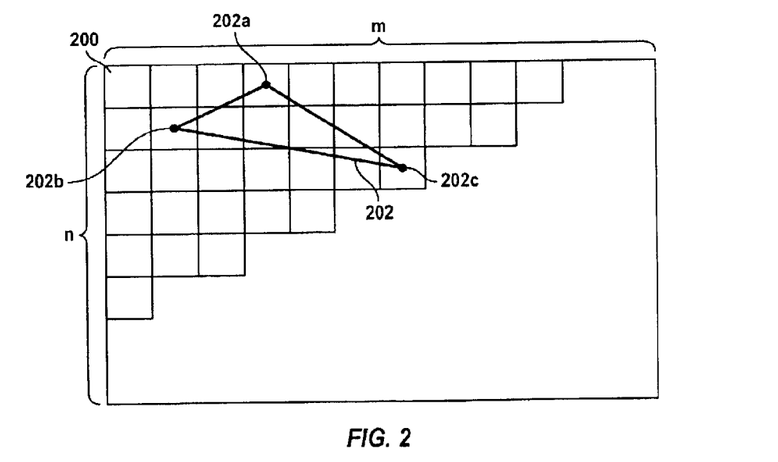
FIG. 2 illustrates a portion of an exemplary frame comprising a number of tiles.

Geometry processor 10 supplies the graphics data to a binning engine 112. Using the graphics data, binning engine 112 reproduces the associated 13 geometries and modes in an image frame which comprises a plurality of grid-like regions referred to as tiles. FIG. 2 shows a portion of a frame segmented into a number of tiles. A tile may be defined, for example, by a 32 pixel by 32 pixel square area of the frame. Binning engine 112 determines which tiles are "touched" by each geometry. For every tile, the graphics data for each geometry touching the tile is linked to the tile. This linked data is output by binning engine 112 per tile. A memory controller 114 is coupled to binning engine 112 and routes the tile data for storage into various portions, or bins, of a graphics memory 116. The portion of graphics memory 116 that is designated for storing binning data is sometimes referred to herein as binning memory. A rendering engine 118 is coupled to memory controller 114 and accesses the binned graphics data contained in graphics memory 116 to render an image for display. In the rendering engine a tile frame buffer may be cached locally to eliminate external frame buffer accesses. The process of rendering an image is thus optimized by storing graphics data into local graphics memory (or binning memory) such that it can be readily retrieved by rendering engine 118 to generate an image frame.

It is to be understood that the various functional blocks in the graphics system 100 may be implemented by a combination of hardware and/or software, and that in specific implementations some or all of the functionality of the various blocks may be combined into an integrated solution. For example, while the diagram shows graphics memory 116 as a separate block from graphics processor 102, a certain amount of memory for binning or other purposes may be provided in the graphics processor block. Another implementation may combine interface controller and graphics processor, and combine graphics and system memory resources into an integrated chipset. Geometry processor 110 may be implemented as part of CPU 104 eliminating the need for a separate processor. Also, in alternative embodiments, the binning function may be implemented by software on a general purpose CPU or DSP.

The memory requirements for such a system will next be examined using exemplary numbers for illustrative purposes. To render, for example, 1 Million triangles per second (1 Mtris/s), at an exemplary frame rate of 30 Hz, the amount of memory needed to buffer the geometry is approximately:

30~60 Mbytes/s/30/s=1~2 Mbytes

The buffering size scales linearly with the performance such that, for example, for 5 Mtris/s, the amount of required memory would be approximately:

5*1~2 Mbytes=5~10 Mbytes

This increase in demand for memory is exacerbated by the desire to bin geometries of a current frame in parallel with rendering geometries of a previous frame. Double buffering has been proposed as a means to enable this type of parallel processing of consecutive frames. While binning of the current frame is going on in one buffer, the rendering of the previous frame is using the other buffer. The roles of these two buffers are simply switched at the frame boundary. Unfortunately, double buffering requires too much buffering memory to accommodate a rendering performance of 5~10 Mtris/s.

To address the ever increasing demand for memory by such graphics systems, the present invention implements a demand-based scheme to drastically increase efficiency in use and allocation of memory resources. Broadly, the buffering memory is segmented into pages of sufficient granularity, one or more of which can then be allocated per tile depending on that tile's requirements. The invention divides the pages of memory into two types, pages currently allocated to tiles, and unused pages. Unused pages are kept track of in an unused page pool. Each tile is allocated with a variable number of pages scattered in the memory. In one embodiment, pages in the unused page pool or each tile are organized in a linked list referred to herein as a chain. Whenever the screen tiler needs more pages so that it can store more data to a tile, it attempts to capture pages from the unused pool. If it succeeds, the references of these pages are removed from the unused page pool, and these pages are allocated to the requesting tile. If it fails, the screen tiler stalls (which in turn stalls the upstream geometry processing) and waits until pages get released back into the unused pool. After the content of a page has been consumed by the rendering pipeline, the page is released back into the unused page pool. This allows the rendering buffer and the binning buffer to share memory resources. The page-based scheme also removes the issue of limiting the memory size for a single tile, because more pages can always be allocated to a single tile as long as there are unused pages left in the page pool. Therefore, the case of all geometries lying in a single tile does not cause an exception under this scheme. It is to be noted that this scheme can be applied to either the graphics memory or system memory.

Figure 3:
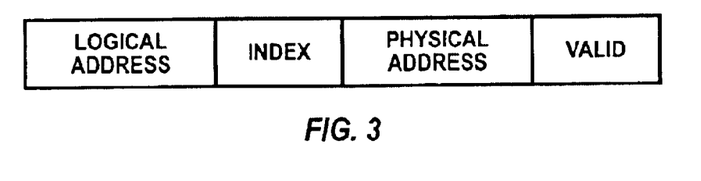
FIG. 3 shows an exemplary page descriptor according to the present invention.

In a specific embodiment, the present invention configures the memory into multiple pages as follows. There is a default size used for all the pages. This size can be made configurable through a global register, and can be set to, for example, 0.5, 1, 2, 4 or 8 Kbytes. Each page has an associated page descriptor that is stored in a page table in memory. A page descriptor includes information as to current availability of the page, the page physical and logical addresses, as well as a page index that indicates the next page in the chain. Pages are preferably processed in chains to allow for pre-fetching. In a specific example, a page descriptor includes a valid bit that indicates the availability of the page. If the valid bit is, for example 0, it signifies that memory has not been allocated for this page. If a new page is to be allocated to the binning engine and no more valid pages are available, the page allocation logic stalls until more pages become available. The page descriptor further includes a physical address for the beginning of the page. This address may use, for example, the top 23 bits of the page descriptor, of which the bottom 1–4 bits are ignored for page sizes of 1, 2, 4 or 8 Kbytes. A logical address is also provided for the beginning of the page, using for example 17 bits for positions [25:9] in the page descriptor (with address [31:26]=0). The logical address may be allocated on the fly when the page is added to a chain. The page descriptor also includes a page index to identify the next page in the chain (e.g., 15 bits). In one example, all "1's" signifies this is the last page in the chain. FIG. 3 shows an exemplary embodiment of a page descriptor 300 with the fields as described above.

Figure 4A:
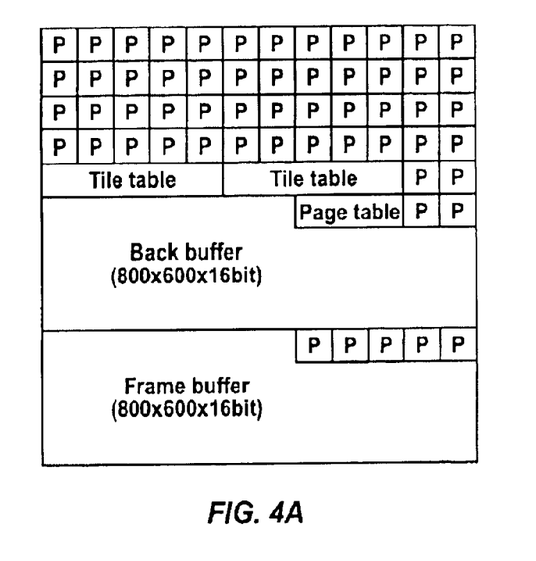
FIGS. 4A and 4B show examples of memory configurations according to the present invention for graphics memory and system memory, respectively
Figure 4B:
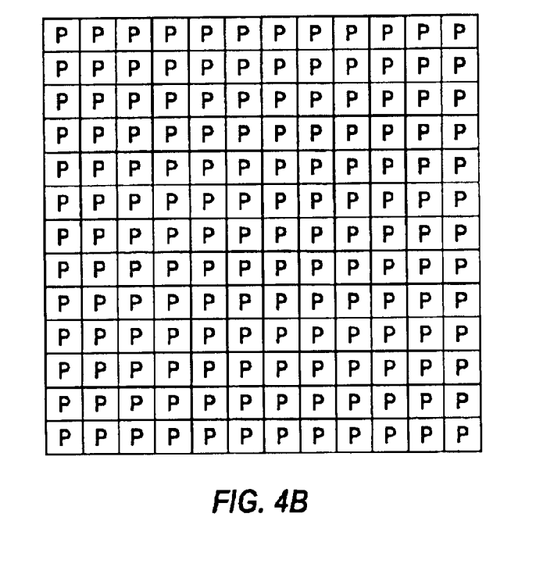

Pages start by being free and get allocated as a frame is binned. The used pages remain reserved until rendering begins. According to one embodiment of the present invention, pages can be allocated from different memory resources including, for example, both the graphics memory as well as the system memory. To accomplish this, separate chains of free pages are provided for each memory resource. The pages are returned to the beginning of the correct chain, which is selected based on their physical address, when they are freed. At initialization time, all the pages are linked in the correct free chain (in system or graphics memory) and, in order to be usable by the page allocation logic, the registers storing the list of free pages are initialized with the values of the first page descriptor in each chain. FIGS. 4A and 4B show examples of memory configurations for graphics memory and system memory, respectively. The small squares marked "P" are the binning/render buffer pages. To take advantage of all the available memory, the virtual memory pages, the tile tables, and the page table can be allocated in the unused memory between larger areas, for example, at the end of the frame buffer and back buffer, which typically have "odd" sizes (not a power of 2).

Figure 5:
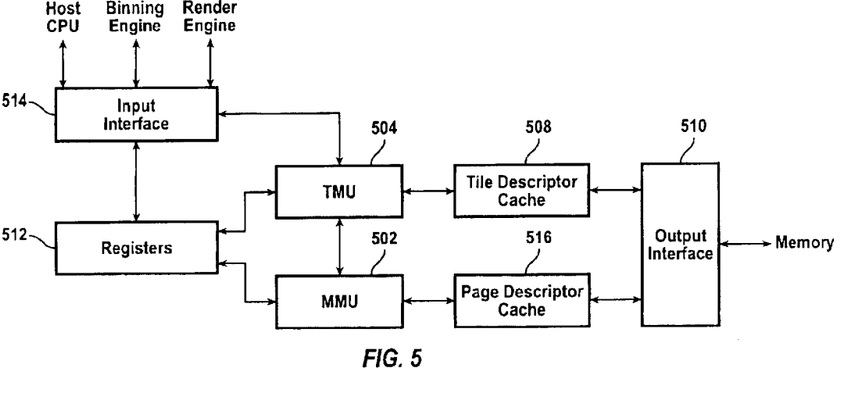
FIG. 5 is a block diagram for an implementation of a memory controller according to an exemplary embodiment of the present invention.

Referring back to FIG. 1, managing and allocating pages, maintaining page descriptors and all other related memory functions are performed by memory controller 114. FIG. 5 shows a block diagram for an implementation of memory controller 114 according to an exemplary embodiment of the present invention. The two main blocks within memory controller 114 are memory management unit (MMU) 502, which performs all the functions related to maintaining pages of memory, and tile management unit (TMU) 504, which maintains tile descriptors and implements the algorithm that frees and re-allocates pages of memory for each tile. In this specific embodiment, memory controller 114 is provided with internal caches to reduce the latency of various operations. A page descriptor cache (PDC) 506 couples to MMU 502, and a tile descriptor cache (TDC) 508 couples to TMU 504. MMU 502 and TMU 504 access the memory via their respective caches and an interface circuit 510. A set of registers 512 couple to both MMU 502 and TMU 504 as well as another interface circuit 514. Interface circuit 514 facilitates the interface between the memory controller and the graphics processor (binning engine and rendering engine) as well as a host CPU.

Memory Management Unit

In one embodiment, MMU 502 is implemented by a state machine that performs all page related memory operations. Among the various functions performed by MMU 502 is page allocation including moving a page from a "free" pool to a tile list. MMU 502 allocates pages dynamically as the binning engine writes into a tile. When the address falls past the end of the current page, the next page from the free pool is assigned for that particular tile. In order to optimize sequential page accesses when the rendering engine 118 reads the tile data, MMU 502 prefetches the descriptor of the next page into the internal registers. In case an address falls outside a prefetched page, MMU 502 is able to skip pages in a chain. This is referred to herein as "page walking" and is accomplished by reading the link index from the page descriptor of a page to be skipped and fetching the descriptor of the following page in the chain from the page table one or more times, until the page descriptor containing the virtual address to be accessed is fetched.

Figure 6:
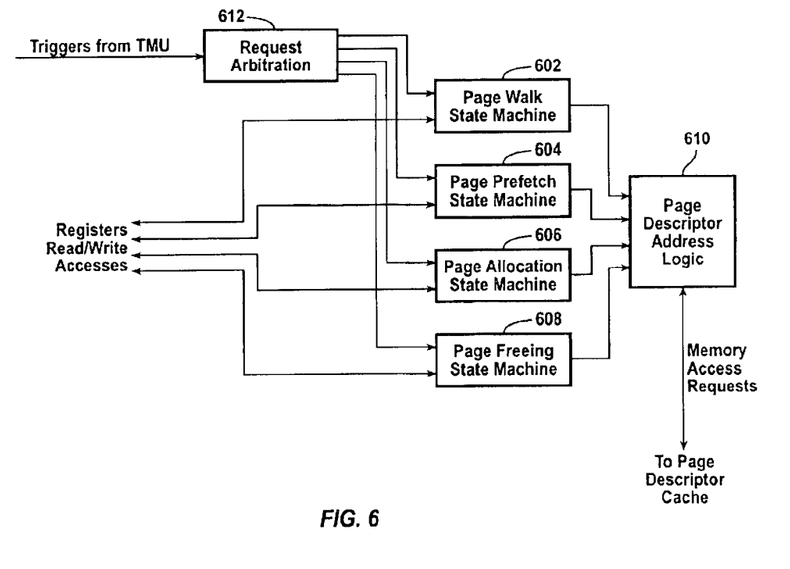
FIG. 6 is a functional block diagram of an exemplary implementation for a memory management unit according to the present invention

When the rendering engine moves from one page to the next, the old page is freed. MMU 502 returns a freed page to the free pool. If page walking is involved, all the skipped pages are freed. Pages that are freed explicitly by the rendering engine are the last pages in each tile, which are freed when the rendering engine closes the tile. MMU 502 also operates to transfer pages from the list used by the binning engine, to the one used by the rendering engine. An example of a typical life cycle of a page is as follows:

1. Free ->Binning (added at the end of a tile which is part of the binning buffer)
2. Binning ->Reserved (close the binning buffer for write)
3. Reserved ->Rendering (open the render buffer for read)
4. Rendering ->Free FIG. 6 provides a functional block diagram of an exemplary implementation for MMU 502. A state machine is provided for each of the various functions preformed by the MMU including a page walk state machine 602, a page prefetch state machine 604, a page allocation state machine 606 and a page freeing state machine 608. Each one of these state machines communicates with the registers for read/write purposes. A page descriptor address logic 610 receives inputs from the various state machines and communicates memory access requests to the page descriptor cache. MMU 502 also includes a request arbitration block 612 that receives requests for the various operations (e.g., page allocation, prefetching, etc.) from TMU 504. The requests may occur at any time, and at any given time there may be several requests pending. Request arbitration block 612 decides the sequence of the requests and applies the request signals to the individual state machines.

Tile Management Unit

In order to optimize the memory utilization, the present invention provides TMU 504 to implement the algorithm by which pages from the rendering buffer are freed when they are no longer needed and then re-allocated to the binning buffer. In one embodiment, each tile is allocated a virtual address space of, for example, up to 64 Mbytes (26 address bits). For systems where two frames are being processed at the same time, two tile descriptor tables are provided in memory for each of the rendering buffer and binning buffer. Alternative embodiments may include one or more than two tile descriptor tables.

Figure 7:
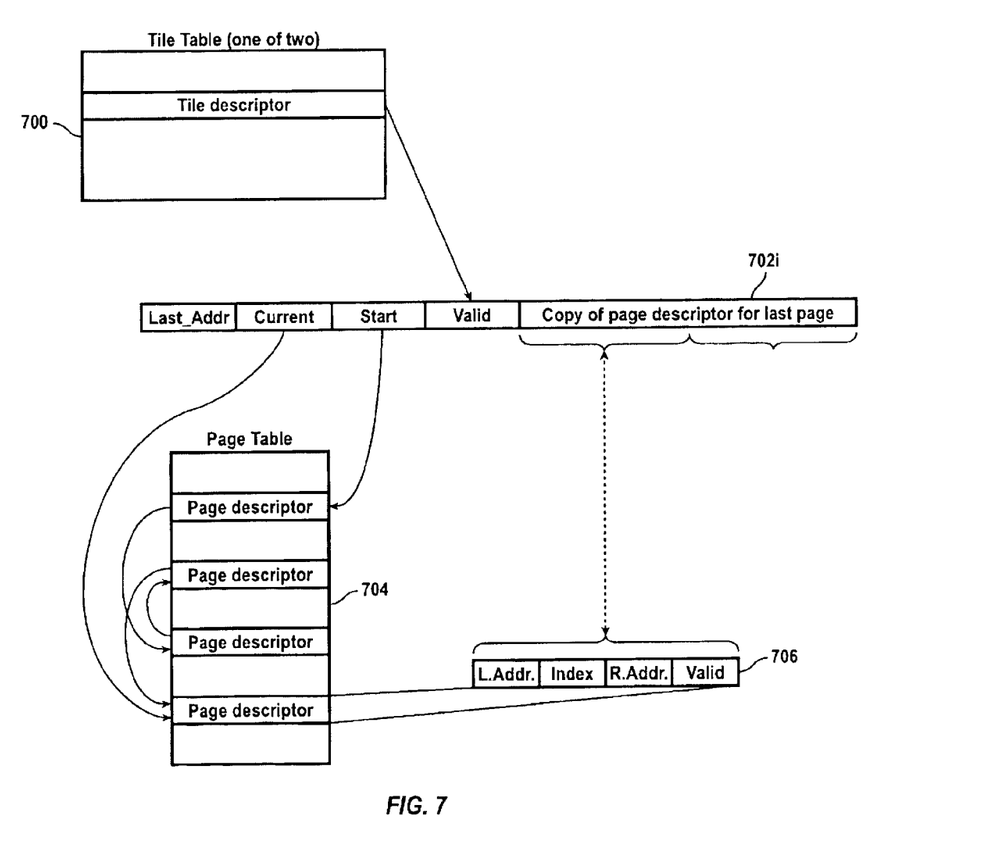
FIG. 7 shows a tile descriptor table and relationship between tile and page tables according to an illustrative embodiment of the present invention.

A tile descriptor table, according to an illustrative embodiment of the present invention is shown in FIG. 7 which also shows a tile descriptor 702(i) that includes the following fields:

Last virtual address (Last_Addr) used for writing to the tile. In this example, the bottom 13 bits of the field are designated for this information. Whenever a tile is written to, the corresponding "last access" address is updated.

Valid bit indicating the tile "exists". TMU 504 ignores the entries that contain, for example, a "0" in this bit. If the rendering engine requests a tile to be opened for read and the tile is invalid, it will receive a value of "0" as the "last access" address, indicating an empty tile.

Start page index for the tile (e.g., 15 bits).

Current page index (e.g., 15 bits).

Replica of the page descriptor for the last accessed page in the tile. Storing this information redundantly, both in the page table and in the tile descriptor, reduces the number of memory read requests, and therefore the latency of the tile open operations.

FIG. 7 also depicts the relationship between tile and page tables. A tile table 700 stores the tile descriptors 702, an example of which (702*i*) shows the various fields. An exemplary allocation of pages for the tile with tile descriptor 702*i* is shown in page descriptor table 704. FIG. 7 also shows the various fields of a page descriptor 706.

Figure 8:
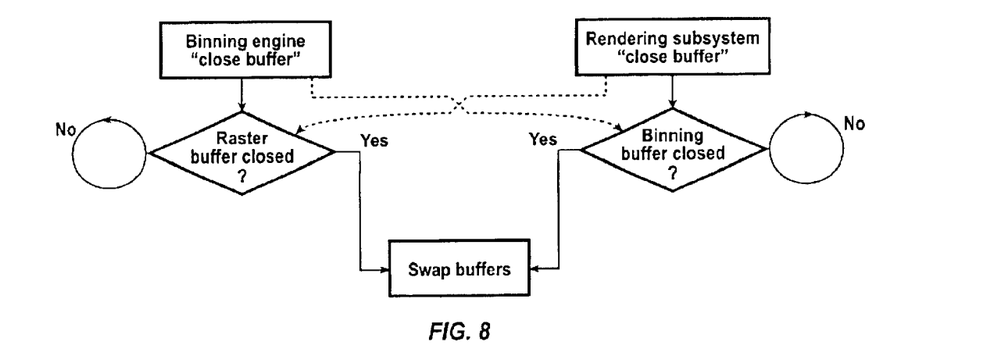
FIG. 8 illustrates an embodiment of buffer swapping according to the invention.

Another function performed by the TMU is buffer swapping to allow for parallel processing of two frames. An embodiment of buffer swapping according to the invention is depicted in FIG. 8. When the binning engine finishes binning a new frame, it performs a "close for write" command on the binning buffer. From this point on, all "tile open" operations issued by the binning engine are stalled until the rendering buffer is also closed and the two buffers can be swapped. Subsequent "close for write" from the binning engine are also stalled until the rendering buffer is closed and then re-opened. In the exemplary embodiment, a third close is illegal. When the rendering engine finishes rendering the current frame, it performs a "close for read" command, which signals the memory controller that it can swap the binning/rendering buffers, if the binning buffer was previously closed by the binning engine; otherwise, the "tile open" operations from the rendering engine will be stalled. That is, whichever block finishes first waits for the other to also finish to be able to support the system with two buffers. It is to be understood, however, that it is possible to add more buffers (i.e., a third tile descriptor table) and work in a "triple buffer" mode.

Figure 9:
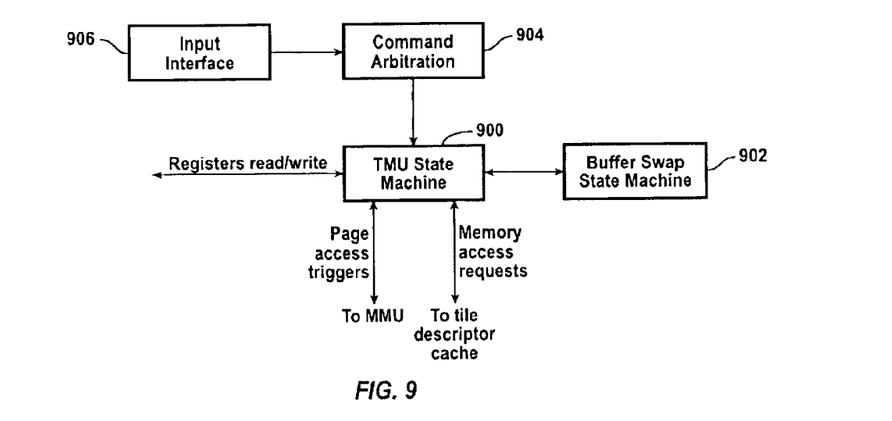
FIG. 9 is a functional block diagram of an exemplary implementation for a tile management unit according to the present invention.

FIG. 9 is a functional block diagram of an exemplary implementation for TMU 504. A TMU state machine 900 is provided that implements the tile management algorithm. A buffer swap state machine 902 couples to TMU state machine 900, and performs the buffer swapping unction. A command arbitration block 904 decides the sequence of commands from the binning or the rendering engine (e.g., "open tile," "close buffer," etc.) before supplying them to TMU state machine 900. TMU state machine 900 is also coupled to read/write registers and the MMU as shown.

As mentioned above, to reduce the latency of the operations that require accessing the tables, memory controller includes two caches: page descriptor cache 506 for the page descriptor table, and tile descriptor cache 508 for the tile descriptor table. To reduce the latency of the accesses to the page descriptor table, memory controller (114 in FIG. 1) includes memory, such as static random access memory (SRAM), to provide a caching mechanism for this table. In one embodiment, when the memory controller allocates a page to the binning engine, the page is taken from the beginning of one of the chains of free pages. When a page is no longer needed because its content has been already read by the rendering engine, and is freed, it is inserted at the beginning (i.e., as the first page) of a chain of free pages. This algorithm increases the temporal locality of the page descriptor accesses and therefore improves the hit ratio of the page descriptor cache. Not appending the free page at the end of the chain also saves a read operation since this algorithm requires that only the "first page" register be updated.

In systems using two tile descriptor tables, one for the binning buffer and one for the rendering buffer, the access pattern to the two tables of tile descriptors is very different. The binning engine may jump back and forth between different tiles, because the geometry data can refer to triangles that are in different places on the screen. The rendering engine, on the other hand, opens a tile, renders everything inside it, and then moves to another tile. The binning engine, therefore, requires a lot more tile operations the latency of which directly impacts the overall binning performance, whereas, the one-time latency of the "tile open" operation in the rendering engine is acceptable. Given this difference, in one embodiment, the present invention provides a cache for the binning tile descriptor table and no cache for the rendering tile descriptor table. In a specific embodiment, when a frame is binned in its entirety, before the rendering engine starts rendering the tiles in that frame, the tile descriptor cache is flushed. The operation of the tile descriptor cache will be described in greater detail hereinafter in the context of a specific exemplary embodiment. In this example, the binning buffer tiles are organized in "super-tiles" made up of multiple tiles, e.g., four tiles arranged as a two-tiles-wide by two-tiles-high square, each numbered as follows:

0 1

2 3

The tile descriptor cache contains eight cache lines, each line containing the four tile descriptors for a "super-tile." The tile descriptor cache in this exemplary embodiment is organized as a fully associative cache. The replacement policy is "random" using, for example, an 8-bit random number generator. In order to optimize cache fills or spills, the tiles in a "super-tile" use sequential entries in the tile table. In one embodiment, the correspondence between the tile number and its position in the "super-tile" is calculated by the hardware. The following is an example of a tile table for an 800×600 screen (25×19 tiles), using a 32×20 organization. The 0, 1, 32, 33, 2, 3, 34, 35, . . . organization corresponds to the following screen:

| 0 | 1 | 2 | 3 | 4 | 5 | 6 | 7 | ... | 24 | 25 | ... | 31 |
|---|---|---|---|---|---|---|---|---|---|---|---|---|
| 32 | 33 | 34 | 35 | 36 | 37 | 38 | 39 | ... | 56 | 57 | ... | 63 |
| 64 | 65 | 66 | 67 | 68 | 69 | 70 | 71 | ... | 88 | 89 | ... | 95 |
| 96 | 97 | 98 | 99 | 100 | 101 | 102 | 103 | ... | 120 | 121 | ... | 127 |
| 128 | 129 | 130 | 131 | 132 | 133 | 134 | 135 | ... | 152 | 153 | ... | 159 |
| 160 | 161 | 162 | 163 | 164 | 165 | 166 | 167 | ... | 184 | 185 | ... | 191 |
| . | . | . | . | . | . | . | . | | . | . | | . |
| . | . | . | . | . | . | . | . | | . | . | | . |
| . | . | . | . | . | . | . | . | | . | . | | . |
| 576 | 577 | 578 | 579 | 580 | 581 | 582 | 583 | ... | 600 | 601 | ... | 607 |
| 608 | 609 | 610 | 611 | 612 | 613 | 614 | 615 | ... | 632 | 633 | ... | 639 |

The bold tile numbers are the visible tiles, while the others are outside the real screen. The invisible tiles use entries in the tile table, but those entries will show "empty" tiles (i.e., valid bit is 0).

The present invention thus provides a demand-based memory system and methods of operating the same that drastically increases the efficiency in memory use and allocation in graphics systems. In a graphics system using a tiled architecture, instead of pre-allocating a fixed amount of memory for each tile, the present invention dynamically allocates varying amounts of memory per tile depending on the demand. While the above provides a detailed description of certain specific embodiments of the invention, various alternatives, modifications and equivalents are possible. For example, an entry in the page table could contain several page descriptors, thus reducing the number of memory accesses performed by the MMU, or multiple chains of pages could be maintained for each tile, thus allowing the tile data to be subdivided into different "streams," or multiple sets of binning buffer and render buffer pairs could be maintained, thus allowing either the geometry data in one image to be further subdivided or multiple pages to be rendered simultaneously. The scope of the present invention is thus not limited to the specific embodiments described, and is instead defined by the following claims and their full breadth of equivalents.

What is claimed is:

1. A memory system comprising:
    memory divided into a plurality of pages and configured to store graphics data;
    a memory management unit coupled to the memory and configured to maintain a plurality of page descriptors corresponding to the plurality of pages; and
    a tile management unit coupled to the memory and configured to maintain a plurality of tile descriptors corresponding to a plurality of screen tiles,
    wherein, the memory management unit allocates one or more pages of memory to store data associated with a given screen tile,
    wherein each page of memory has an associated page descriptor that is configured to store information specific to that page, and wherein the memory system further comprises a page descriptor table that stores a plurality of page descriptors.

2. The memory system of claim 1 wherein a page descriptor comprises:
    a valid field indicating availability of the page;
    an address field indicating a location of the page in memory; and
    an index field indicating location of a next page descriptor in its respective chain of pages.

3. The memory system of claim 2 wherein the address field in the page descriptor includes a physical address and a logical address.

4. The memory system of claim 1 wherein each screen tile has an associated tile descriptor, and wherein the memory system further comprises a tile descriptor table that stores a plurality of tile descriptors.

5. The memory system of claim 4 wherein a tile descriptor comprises:
    a valid field indicating the tile exists;
    start page index field for the tile; and
    current page index field.

6. A memory system comprising:
    memory divided into a plurality of pages and configured to store graphics data;
    a memory management unit coupled to the memory and configured to maintain a plurality of page descriptors corresponding to the plurality of pages; and
    a tile management unit coupled to the memory and configured to maintain a plurality of tile descriptors corresponding to a plurality of screen tiles,
    wherein, the memory management unit allocates one or more pages of memory to store data associated with a given screen tile,
    wherein the memory system further comprises:
    a page descriptor cache coupled between the memory management unit and the memory, and configured to provide caching capability for the page descriptor table; and
    a tile descriptor cache coupled between the tile management unit and the memory, and configured to provide caching capability for the tile descriptor table.

* * * * *